Dec. 9, 1969          C. KELLER          3,482,658
PARKING BRAKE MECHANISM
Filed Nov. 20, 1967          2 Sheets-Sheet 2
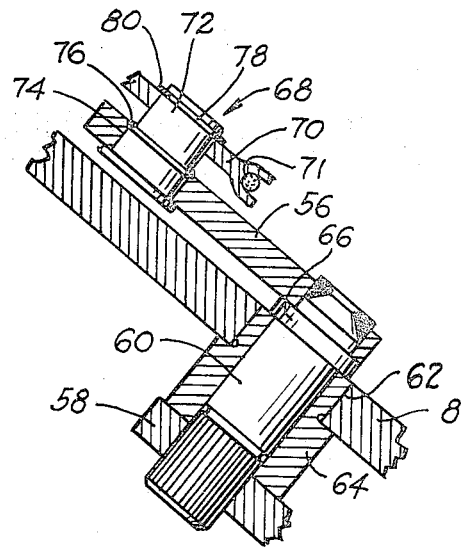
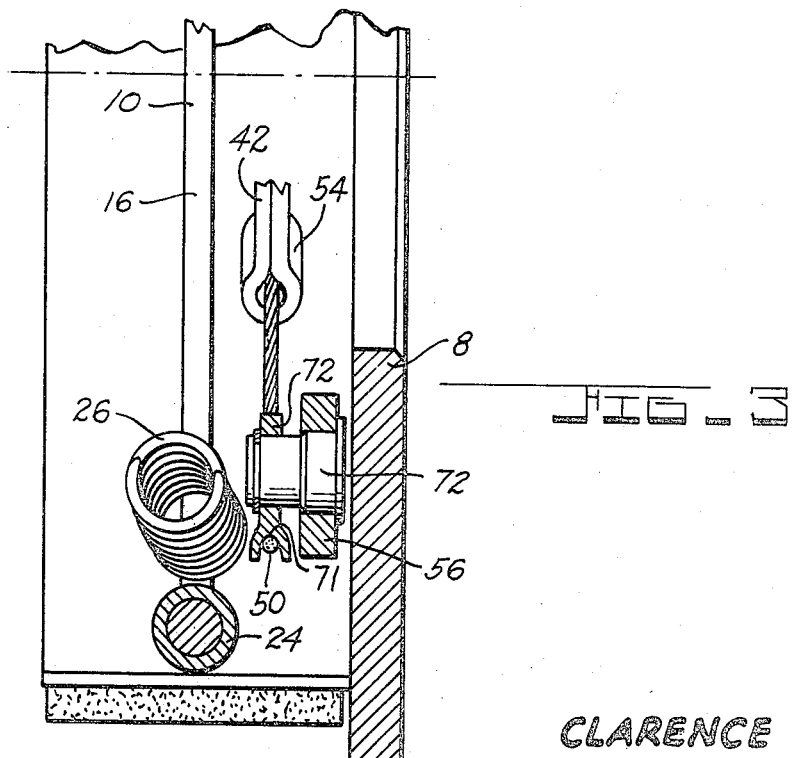
INVENTOR.
CLARENCE KELLER.
BY
ATTORNEY.

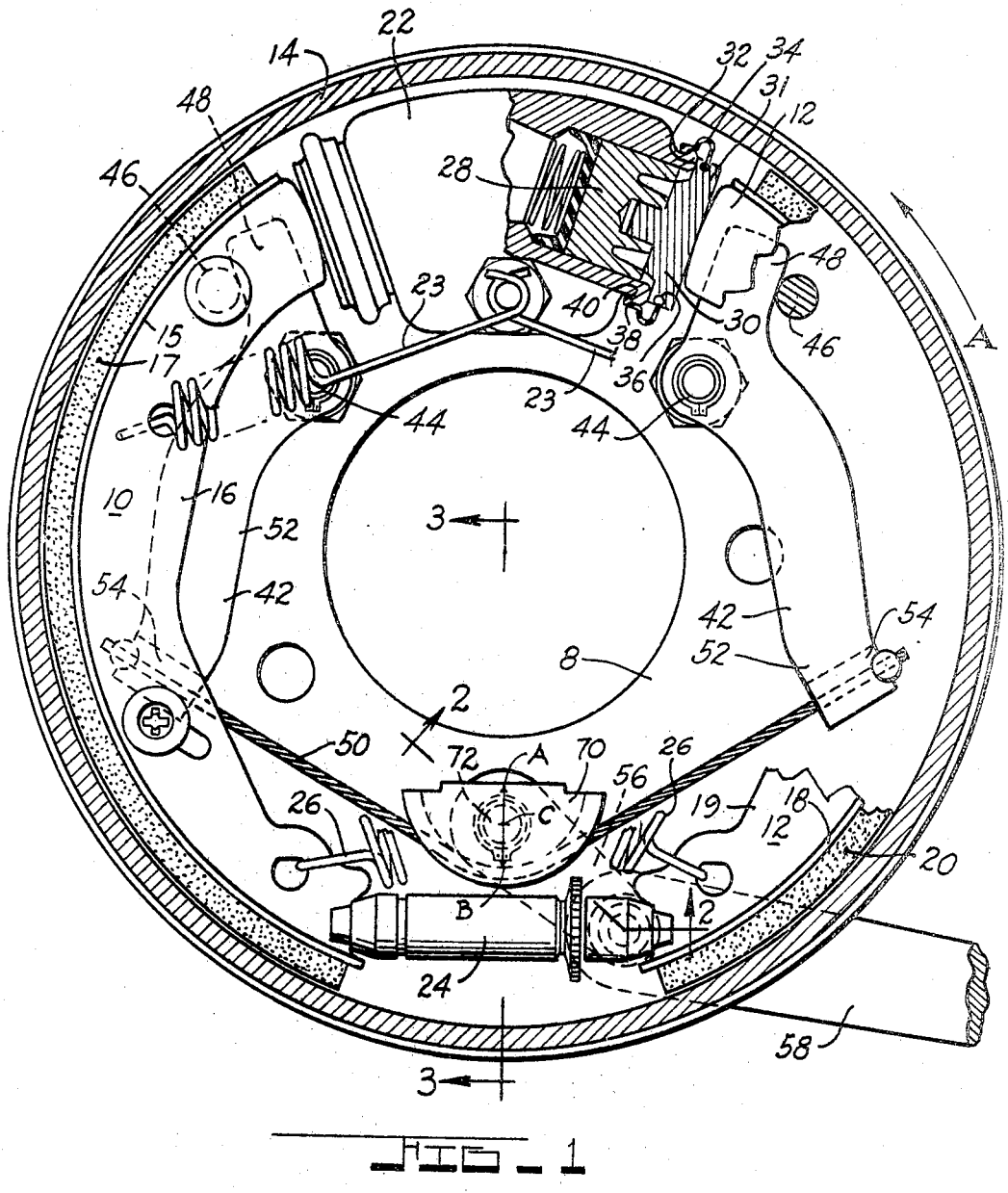
FIG_1
INVENTOR.
CLARENCE KELLER.
BY
ATTORNEY

United States Patent Office 3,482,658
Patented Dec. 9, 1969

1

3,482,658
PARKING BRAKE MECHANISM
Clarence Keller, South Bend, Ind., assignor to The
Bendix Corporation, a corporation of Delaware
Filed Nov. 20, 1967, Ser. No. 684,215
Int. Cl. F16d 51/00, 65/14; F16h 27/02
U.S. Cl. 188—78                              2 Claims

ABSTRACT OF THE DISCLOSURE

A drum brake assembly havig a pair of brake shoes arranged in end to end relationship on a fixed support member and provided with a pair of levers each of which is operatively connected to a respective of said brake shoes for moving said shoes into engagement with the brake drum. A cable interconnects the levers and a bell crank is pivotally carried on the support member and is operatively connected to the cable to rotate said levers in opposite directions.

BACKGROUND OF THE INVENTION

In the earlier issued U.S. Patent 3,322,237, of which I am a joint inventor, the bell crank, which is pivotally supported on the fixed support member or backing plate, is operatively connected to the cable and levers through an annular sleeve (pulley) rotatably pivoted about its axis of rotation. This arrangement is satisfactory so long as the brake applying forces per unit area between the surface of the sleeve and the cable do not become substantial or excessive. However, since these brake applying forces do tend to become substantial and are very often difficult to control, it is important to find a way to reduce the forces per unit area on the cable and yet not add to the cost of the brake. Enlarging the diameter of the pulley exposes a greater surface area of the pulley in contact with the cable. However, increasing the diameter of the pulley also has its limitations because of interference with the other brake parts. That is, substituting a larger pulley in order to subject a greater area of the pulley to contact with the cable is practical only within narrow limits because of the interference with other brake parts.

SUMMARY OF THE INVENTION

In view of the foregoing, it is an object of this invention to provide a drum brake with a mechanical actuator which is efficient and yet sufficiently rugged to handle the brake applying forces.

Another object of the invention is to provide in a shoe and drum brake assembly a brake actuating mechanism comprising a cable operatively connected to the shoes and a pulley sigment pivotally carried on a fixed support member off center from said pulley center.

The above and other objects and features of the invention will become apparent from the following description taken in connection with the accompanying drawings.

BRIEF DESCRIPTION OF THE DRAWINGS

FIGURE 1 is a front elevational view of a brake assembly showing the invention;
FIGURE 2 is an enlarged view in section taken on the line 2—2 of FIGURE 1; and
FIGURE 3 is a view taken along section line 3—3 of FIGURE 1.

The brake assembly of FIGURE 1 includes a backing plate 8 which is adapted to be attached to a fixed part of a vehicle such, for example, as an axial flange, not shown. Brake shoes 10 and 12 are slidably carried on the backing plate 8 in end to end relationship for frictional engagement with a rotatable drum 14 fixedly mounted to a vehicle wheel, not shown. The brake shoe 10 comprises a rim 15, web 16 and lining 17 securely attached to the web 16. The brake shoe 12 comprises a rim 18, web 19 and lining 20, securely attached to the web 19. A wheel cylinder housing or body 22 is secured to the top of the backing plate 8 in any well known manner. The housing is positioned between the upper opposed adjacent ends of the shoes 10 and 12. Shoe return springs 23 retain the upper adjacent shoe ends in a brake released position. An adjusting strut 24 is located between the adjacent lower shoe ends of the shoes 10 and 12, respectively. A spring 26 is interconnected between the lower shoe ends of the shoes 10 and 12 in order to hold the shoe ends in engagement with the adjusting strut 24.

The wheel cylinder housing which communicates in a well known manner with the hydraulic braking system of the vehicle for operating the service brakes includes a pair of pistons 28 slidably received in the opposed ends of the cylinder 22. A cap 30 is attached to each of the pistons and is provided with an annular flange 31 which rests on an annular end surface 32 at the ends of the cylinder housing for anchoring thereon. A boot 34 has one end engaging a groove 36 of the cap and the other end of the boot is formed with a bead 38 which rides in groove 40 formed in the housing end. Attachment of the boot in this manner prevents road dust, etc. from working into the ends of the cylinder 22. Fastening devices 44 pivotally secure a pair of levers 42 to the backing plate 8. An anchoring projection 46 is located on the underside of each shoe web for engagement with free end 48 of lever 42. A cable 50 is interconnected between the shoe applying ends 52 of the levers 42. Each end of cable 50 extends into a connector 54 which securely fastens the cable ends to the ends 52 of the levers 42.

First and second actuating levers 56 and 58 are rotatably secured to the backing plate 8 through a common shaft 60. The shaft 60 extends through an opening 62 in the backing plate and is received in a bushing 64 mounted in the opening 62. The arrangement of the first and second actuating levels 56 and 58, respectively, forms a bell crank which enables an operator to mechanically apply the brakes in an emergency or as parking brake through rotation of lever 58. Lever 58 is splined to shaft 60 and may be angularly adjusted on the shaft as desired. The lever 56 is securely fastened to the other end of shaft 60 in any suitable manner such as by welding. Clearance between the backing plate and lever 56 is obtained by inserting a washer 66 between the lever and end of bushing 64. Actuating lever 56 is operatively connected to the cable 50 through means 68 comprising a pulley segment or member 70 having a curved surface of revolution or bifurcated arcuate portion 71 in contact relationship with the cable. The member 70 is pivotally carried on a stub shaft 72, the latter of which extends through an opening 74 of the actuating lever 56 and is press fitted into the opening 74 and welded at 76 to the lever. The outer end of the stub shaft 72 is formed with a groove 78 which receives a lock ring 80 for retaining the pulley segment or member 70 on the shaft 72. The member 70, or pulley segment, is pivotally mounted to the stub shaft 72 at a point C measured along the radius A–B of said pulley which is off center from said pulley center A. That is, the radius C–B about which the member 70 pivots is less than said radius of curvature A–B of said member. This off center pivotal position of said member 70 permits the member to have only limited rotation along said cable during the application of a brake applying force but will not allow the member to rotate out of contact with the curved surface thereof. Pivoting the pulley segment at a point C, measured along the radius A–B of the pulley, which is off center from the pulley center A, permits the use of a pulley having a much larger surface of revolution than would be possible if the pulley were pivoted at its true center of rotation. Therefore, the greater the surface of revolution, the larger the area for cable contact, thus a reduction in the forces per unit area applied to the cable. Cable wear is also reduced. The off center pivotal arrangement of the member 70 also forces the member to rotate with cable motion due to the changing length of the radius or moment arm about the pivot. The off center pivotal arrangement of the pulley segment permits the use of a large radius pulley segment with maximum hub clearance. The pulley segment is also self centering.

OPERATION

Assuming drum rotation to be in the direction of arrow A, hydraulic actuation of the brake assembly will be as follows: Upon pressurization of the fluid in wheel cylinder housing 22, pistons 28 will thrust the shoes 10 and 12 outwardly into engagement with the drum 14. The rotation of the drum 14 in the direction of the arrow will tend to rotate the brake shoes as a unit in a counterclockwise direction with the main thrust exerted on the shoe 10 transmitted through the strut 24 to the shoe 12 to thereby force shoe 12 to anchor at its upper end on cap 30 and hence on the cylinder houisng 22. Upon release of the fluid pressure from cylinder 22, the shoe return springs 23 will return the upper adjacent ends of the shoes to their release position against the caps 30.

Mechanical operation of the brake is as follows: Rotation of the lever 58 upwardly as shown in FIGURE 1 rotates the first and second actuating levers in a counterclockwise direction about shaft 60. The lever 56 will press the member 70 into the cable 50 to thereby draw the two ends of the cable together, rotating the levers 42 in opposite directions and at the same time causing the free ends 48 of the levers to engage the projections 46 to thereby spread the shoes into engagement with the drum. Upon release of the brake applying force to lever 58, the shoe return springs 23 will bring the upper shoe ends of the shoes 10 and 12 back into engagement with the caps 30. At the same time, the first and second actuating levers 56 and 58 will be rotated to an unapplied position.

Although only one embodiment of the invention has been illustrated and described, various changes in the form and relative arrangement of the parts may be made to suit requirements without departing from the spirit of the invention.

I claim:
1. A brake assembly comprising:
a support member;
a pair of brake shoes slidably arranged in end to end relationship on said support member;
a pair of levers, one of which is operatively connected to one of said brake shoes and the other of which is operatively connected to the other of said brake shoes;
means interconnecting said levers in a manner to equalize the applying force thereto and to impart rotation thereof in opposite directions;
said means including, a cable having one end connected to said one lever and the other end connected to said other lever, first and second actuating levers pivotally carried on said support member; and
means carried by one of said actuating levers to operatively connect said actuating levers to said cable intermediate its length;
said last named means including a pulley segment pivotally mounted to said one actuating lever at a point measured along the radius of curvature of said segment which is less than said radius of curvature of said segment to thereby cause said segment to rotate along said cable;
said pulley segment being freely pivotal on said one actuating lever for substantial rocking motion with respect thereto to permit the pulley segment to follow the cable as the first named pair of levers rotate.
2. The invention of claim 1, said pulley segment having a central bearing portion fixed to said one actuating lever and a grooved peripheral portion for receiving said cable;
said central bearing portion and said peripheral portion lying in a common plane passing through said portions perpendicularly to the axis of rotation of said segment.

References Cited

UNITED STATES PATENTS 3,322,237    5/1967    Keller et al. _____ 188—106 X
3,343,633    9/1967    Kinnel et al. _____ 188—78

MILTON BUCHLER, Primary Examiner

U.S. Cl. X.R.
74—89.22; 188—106